July 23, 1929.  F. E. DONALDSON  1,721,589
HEATING, VENTILATING, AND COOLING DEVICE
Filed Aug. 27, 1928
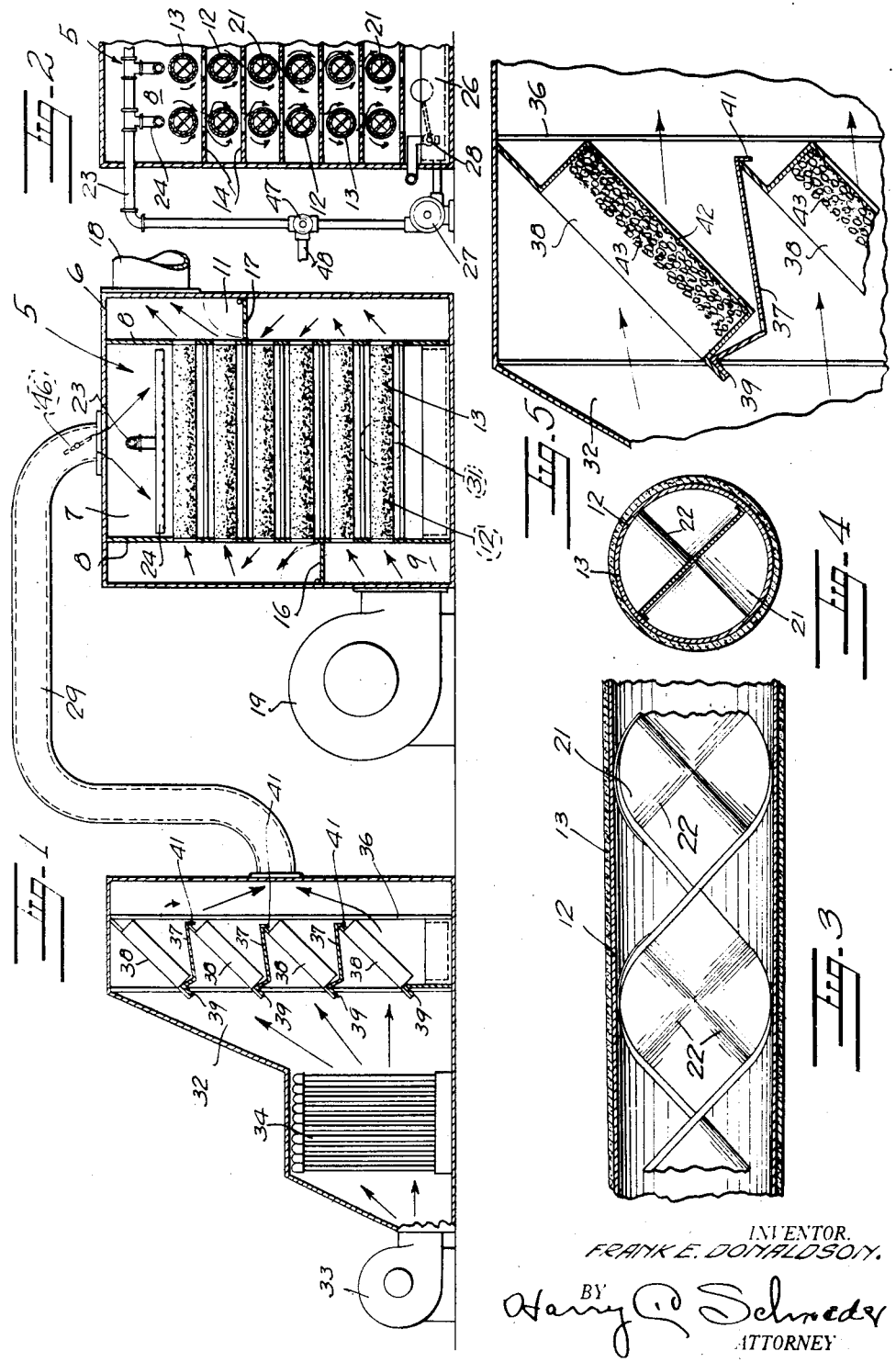
INVENTOR.
FRANK E. DONALDSON.
BY
ATTORNEY Patented July 23, 1929.

1,721,589

UNITED STATES PATENT OFFICE.

FRANK E. DONALDSON, OF OAKLAND, CALIFORNIA.

HEATING, VENTILATING, AND COOLING DEVICE.

Application filed August 27, 1928. Serial No. 302,217.

The invention forming the subject matter of this application relates to an air condition apparatus which especially stresses the mode of reducing the temperature of air supplied for the ventilation of dwellings, auditoriums, and the like.

In heating and ventilating devices in use at present, the usual procedure is to pass the air thru heater coils or, in the case of cooling, over refrigerating coils thru which certain liquids are forced to circulate by a process often prohibitive by the expense of same. Any increase of the heating or cooling surface would involve material change in size and dimensions of the device, which would render the device impractical when the space is limited.

The primary object of the invention is the provision of a heating, ventilating, and cooling device, in which the air is forced thru a tortuous passage, the outer walls of said passage being heated or cooled as the case may be, the air being so conducted thru said passage as to impinge upon the surface of each passage and pass in a spiral path therethrough, thereby being effectively heated or cooled.

Another object of the invention is the provision of a heating and ventilating device having means thereon to compel the air to pass thru a tortuous passage, said means being adjustable so as to change the length of said tortuous passage the air must travel before leaving the device, thereby allowing the heating or cooling of the air to any desired temperature.

A further object of the invention is the provision of a heating or cooling device, in which an intake and an outlet chamber are connected to each other by means of spiral conduits, and in which means are provided to force the air to travel back and forth in the successive conduits, said means being adapted to be so adjusted as to allow the passing of the air thru a larger or smaller number of conduits in one direction before leaving the device, thereby effectively determining the actual heating or cooling surface with which the air contacts during its passage thru the device.

A further object of the invention is the provision of a heating and ventilating device having an inlet and outlet chamber connected by spiral conduits, the conduits being enclosed in a heating chamber, or in a cooling chamber, as the case may be, and maintained thereby at the desired temperature, which is conveyed to the air impinging against the inner walls of said conduits; means being provided to cause the air to travel back and forth in successive conduits, said means being adjustable so as to cause the air to travel thru a certain number of conduits in one direction, thereby reducing or increasing the length of the tortuous passage thru which the air is conducted before it leaves thru the exit section of said heating or cooling device.

A further object of the invention is the provision of a heating or cooling coil, in which a substantially spiral passage is provided, the spiral dividing members being so disposed in the conduit as to obstruct the smooth passage of the air therethru, and to cause the complete whirling and mixing of air in said conduits so that the air impinges upon the dividing spiral walls and also on the inside periphery of the cooling or heating conduit; thus the heating or cooling surface is materially increased within a limited space.

A still further object of the invention is to provide a cooling and ventilating system, in which a cooling chamber is provided with a tortuous passage therethru, the tortuous passage being enclosed in an outer chamber, the individual conduits of the passage being surrounded by a moisture-absorbing material and being maintained in a damp condition; the cooling of the outside walls of the conduits being performed by passing dehumidified air into said inner chamber, thereby causing the rapid evaporation of the moisture around the outside walls of said conduits, which evaporation will result in the cooling of said conduit; the conduit having a spiral passage therethrough for causing the air to thoroughly mix therein; the spiral passage causing eddy currents in the flow; thus the air impinges upon the entire inside circumference of said conduit and also upon the walls of the spiral passage.

A still further object of the invention is the provision of a cooling and ventilating device in which the cooling of the air is accomplished by the cooling of the outside walls of the conduit, in which a tortuous passage is provided for conducting the air therethru, the cooling of the outside wall of said conduit being accomplished by means of a moisture-retaining cover, which is constantly maintained in a damp condition, and by the passing of dehumidified air around each conduit, thereby causing rapid evaporation of moisture therefrom and thus the cooling of the walls of the conduit, the dehumidifying of the air being performed by conducting the air thru an air conditioning chamber, the egress of the air from said chamber being forced thru crystallized calcium chloride, thereby giving up its moisture and becoming dehumidified before it enters the cooling chamber.

Another object of the invention is the provision of a ventilating device which may be readily adapted to be used as a cooling and ventilating device in the summer, and which may be readily transformed into a heating and ventilating device in the winter.

Another object of the invention is the provision of a new and improved method or system of air conditioning which may be readily changed from dehumidifying, washing, and cooling of the air for the summer season to washing, humidifying, and heating of the air during the winter season.

The system is a simpler and less expensive way to obtain controlled air conditions than heretofore prevailed; and at the same time provides, for the building heated, clean, properly humidified air, more energizing and less enervating than now prevails in the average home or auditorium.

Other objects of the invention, together with the foregoing, will be set forth in the following description of the preferred system and the preferred embodiment of means for the system for practicing the same, which is illustrated in the drawing accompanying and forming part of the specification.

It is to be understood that I do not limit myself to the embodiment shown in said description and the drawings, as I may adopt variations of my preferred form within the scope of my invention, as set forth in the claims.

In the drawing:

Figure 1 is a somewhat diagrammatic sectional view of the system as adapted for cooling and ventilating;

Figure 2 is a cross sectional view of the cooling chamber around the air conduits;

Figure 3 is a fragmentary sectional view of an air conduit showing the spiral passage therethru;

Figure 4 is an end view of the conduit shown in Figure 3; and

Figure 5 is a sectional detail of one of the outlet passages from the dehumidifying chamber, particularly showing one arrangement of the calcium chloride thru which the air must pass before it leaves said chamber.

In carrying out my invention, I make use of an air temperature controlling element. This element comprises an outer casing, denoted by the numeral 6, in which an inner chamber 7 is enclosed by partitions 8. The partitions 8 are spaced from the respective walls of the outer casing 6 so as to form an inlet chamber 9 at one side of the casing 6 and an outlet chamber 11 at the other side of the casing 6. The chamber 9 is connected to the chamber 11 by means of pipes 12 positioned in vertical and horizontal rows. The pipes are removably supported in corresponding apertures in the opposite partitions 8, the apertures being surrounded by suitable packing so as to prevent the ingress or egress of air from the inner chamber to the outer chamber. Although in the illustration, six pipes are shown disposed in each vertical row spaced from each other, it is to be noted that any number of pipes may be used, according to the requirements of the air conditioning. Each pipe 12 is surrounded by a moisture-absorbing fabric 13 thruout its full length. An asbestos fabric may be used to render the covering indestructible. The horizontal rows of pipes are disposed directly below each other as shown in Figure 2. Horizontal deflector plates 14 are provided between each row of pipes, the deflector plates extending from one vertical partition 8 to the other, and are slotted just below the pipes, so as to allow the passage of a gaseous or fluid substance, such as air, steam, or water, from the upper row of pipes to the pipes below.

The lower portion of the intake chamber 9 is separated from the upper portion by means of a damper 16 which is thermostatically opened and closed in the usual manner, and when completely closed, it compels the air to pass thru the lower pipes 12 into the lower part of the outlet chamber 11. The upper portion of the outlet chamber 11 is separated from the lower portion by means of another damper 17 which is operated similarly to the damper 16, and which compels the air to return thru the respective pipes into the chamber 9 from the lower part of the chamber 11. It is to be noted that there are two rows of pipes in the illustration below the damper 16, and there are two rows of pipes between the dampers 16 and 17. Therefore, the air will pass from the chamber 9 thru the two lowermost rows of pipes, then return thru the two rows of pipes between the dampers 16 and 17 into the upper portion of the chamber 9, wherefrom it is conducted by the two uppermost rows of pipes, above the damper 17, into the chamber 11 and discharged thru a suitable outlet pipe 18. The air is forced thru said pipe passages by means of a fan 19 connected to the lower portion of the intake chamber 9.

In order to further increase the temperature conducting surface in the pipes 12, each pipe has a spiral baffle 21 therein. Thus, the air is forced to flow thru the pipe on a spiral path contacting with the whole inside periphery of the pipe 12 and also with the spiral baffles 21. It is to be noted that the baffle 21 is not truly spiral, but the changes in the direction of the tortuous path are accomplished by sharp angles 22 instead of the usual curvature so as to cause a sharp turning of the air passage, thereby causing eddy currents in the flow of air and complete mixture of the air. Thus the air efficiently impinges upon the full temperature conducting surface of the pipe and of the spiral baffle plates 21. The heating or cooling of the air is accomplished in the said tortuous passage thru said element 5, by maintaining the pipes 12 at the required temperature.

The temperature of the pipes 12 is maintained by a cooling system in the following manner: A water main 23 extends transversely above the top row of the pipes 12, from which main 23 depend perforated spray pipes 24, each spray pipe being disposed directly above the uppermost pipe 13 of each vertical row so as to spray water upon the moisture-absorbing fabric covering 13 on the pipe. When the moisture-absorbing fabric on the uppermost pipes 12 is saturated, the water drops thru the apertures or slots of the horizontal deflector plates 14 upon the moisture-absorbing fabric surrounding the pipes below, thereby successively saturating the fabric around each pipe in each vertical row. From the lowermost pipe, the water drops into a pan 26, from which pan a pump 27 recirculates the same water again to the water main 23. In order to maintain the water level in the pan 26 constantly above the intake opening of the pump 27, a float valve 28 is provided, which is connected to the water system of the building and which is so adjusted as to replenish the water in the pan 26 when it lowers to a level near the level of the pump intake opening.

The cooling of the pipes 12 is achieved by circulating the dehumidified air around the fabric covering 13, thereby rapidly evaporating the moisture from the said fabric, which will cause the cooling of the walls of the pipes 12. The dehumidified air is introduced into the inner chamber thru a conduit 29, and it is exhausted from the chamber thru an outlet opening 31 on the side of the chamber.

The circulation of the dehumidified air thru the inner chamber thus causes rapid evaporation and effectively cools the walls of the pipes 12, which cooling is transferred to the spiral baffles 21 so that the air forced thru the pipes, in the manner heretofore described, gives up its heat to the pipes and is sufficiently cooled to the desired degree before it is forced out thru the conduit 18.

The dehumidifying of the air for the cooling chamber is performed in a dehumidifying chamber 32. The air is forced into the chamber 32 by means of a fan 33. In the chamber is the usual tempering coil 34 for reconditioning the air temperature. The outlet end of the chamber 32 is provided with a frame work 36, the frame work being horizontally partitioned by means of inwardly sloping plates 37. Diagonally disposed in each section of the frame work 36 and extending the full width thereof is a container 38, which is supported upon the flanged edges 39 and upon depending portions 41 of the said plate 37. Thus, the container 38 is removably supported in the frame 36. Each container has a bottom made of wire netting, denoted by the numeral 42. The container is filled with calcium chloride in a crystallized form, as indicated at 43. Crystallized calcium chloride is so disposed in the container 38 as to completely cover the wire netting 42. It is apparent that the egress of the air from the chamber 32 is obstructed by the calcium chloride 43 over the wire netting 42, and while the air passes thru said wire netting and said calcium chloride, it gives up its moisture to the calcium chloride, thereby being effectively dehumidified. The liquefied calcium chloride flows down the inclined plates 37 and is collected in a suitable pan at the bottom of the dehumidifying chamber. The dehumidified air is then conducted thru the conduit 29 into the top of the cooling chamber and then is forced to move around the whole outside periphery of the fabric 13 on the pipes 12. The air is prevented from flowing directly from the pipe 29 to the inner opening 31 by the horizontal deflector plates 14 so that air must pass thru the slots or apertures in the horizontal deflector plates between the vertically spaced pipes 12, thereby impinging upon the fabric all around the outside circumference of each pipe 12.

This whirling flow of cooling current in the inner chamber will cause rapid evaporation of the water, the air becoming again saturated with the water evaporated from the fabric 13, and the now humidified air is forced out thru the outlet opening 31 by the added pressure created by the continuous passing of the dehumidified air thru the pipe 29, the static pressure being caused and maintained by the operation of the fan 33.

In the cooling and ventilating system, the conduit 18 is connected to the floor of the auditorium or room to be cooled, while the inlet conduit of the fan 33 is connected to the ceiling of the room to be cooled. The foul air escaping thru the openings near the ceiling is conducted to the fan 33, by which it is forced thru the dehumidifying chamber 32, and after being dehumidified, it is forced thru the conduit 29 into the cooling chamber or inner chamber of the cooling element 5, in which the action of the fan 33 maintains the desired static pressure. The cool air is forced in the room thru suitable openings adjacent to the floor of the room, to which openings is connected the conduit 18 or the branches thereof, thereby allowing the action of the fan 19 to force the air thru the cooling pipes 12 and into the room to be cooled.

In a heating and ventilating system, the same element 5 is employed, excepting that the inner chamber thereof is not connected to the dehumidifying chamber 32. In the wintertime, the conduit 29 is closed by means of a damper 46, which is provided at the edges thereof with suitable packing material and is turned and operated in the usual manner for completely closing the passage in the conduit 29. The outlet opening 31 is similarly closed. Between the water main 23 and the pump 27 is a three-way valve 47, one opening of which is connected to a steam line 48. Any standard valve connection could be substituted for the three-way valve 47, its only function being to disconnect the main line 23 from the pump 27 and to connect the same to the steam line 48.

The steam passes into the main pipe 23 and enters the inside chamber thru the perforated pipes 24. It is preferable to use low pressure steam and to maintain in the inner chamber around the pipes 12 a constant steam pressure. The condenser water vapor is collected in the pan 26 and it is removed therefrom in the usual manner. The constant steam pressure communicates its heat to the pipes 12, and the heat is also communicated from the walls of the pipes 12 to the spiral baffle plates 21. Now, the air forced thru the passages of the pipes 12 by the fan 19 takes up the heat of the pipes 12 and of the spiral baffle plates 21 and is thereby heated to the required degree.

The branches of the conduit 18 are so arranged that in the wintertime the branches of the conduit 18, leading to the floor of the room to be heated, can be connected to the atmosphere, while other branches of the conduit 18 can be connected to the ceiling of the room or auditorium to be heated, so that the heated air is forced in thru openings on the ceiling, creating a static pressure in the room, which is slightly higher than the atmospheric pressure, forcing the cold air out thru the openings in the floor. Before the air enters the heating element 5, it may be drawn by the fan 19 thru an air-washing or air-conditioning apparatus, and washed or humidified thereby in the usual manner.

The degree of cooling or heating may be automatically actuated by thermostatic controls. The thermostat or similar instrument may be placed in the room to be heated or cooled. The dampers 16 and 17, in that event, are connected to electrically actuated mechanisms which are controlled by the thermostat. According to the temperature in the room, the thermostat actuates the mechanisms for opening or closing the dampers 16 or 17, thereby regulating the length of the tortuous passage the air must travel before it leaves the outlet or exhaust chamber 11.

It will be recognized that the element 5 may be readily converted from a cooling to a heating element, and it will also be recognized that the elements may be readily used in combination with any cooling and ventilating, or heating and ventilating systems. A long tortuous passage for the air to be cooled or heated and thereby a large heating or cooling surface is thus obtained in a limited space. The whole cooling system, as heretofore described, may be disposed in a small space so as to allow the use of this device in the attic or above the ceiling of the compartment or auditorium to be cooled. The dehumidifying apparatus may be entirely disconnected from the device and the heating or cooling element be connected to any heating and ventilating or cooling and ventilating system. More desirable results in the winter use of the apparatus will be obtained by including some of the well known air washing and humidifying devices.

In the heating or cooling element itself, the use of horizontally placed metal, preferably copper pipes or cylinders 12, enclosing the aforesaid spiral divisions or baffles, and open at the opposite ends thereof, permit the ingress and egress of air to be cooled and heated, the air passing therethru receiving the temperature of the cylinders or pipes. The apparatus, or the elements thereof, are of such a nature that they may be readily included in the installation of established heating and ventilating systems, so as to provide means for efficiently removing the foul air from the room to be heated and force properly reconditioned air into the room.

I claim:

1. In a device of the character described, a casing; a plurality of conduits extending from end to end in said casing; inlet and outlet chambers formed at the opposite sides of the casing in communication with respective open ends of the said conduits; adjustable means in said chambers for directing an air flow thru the successive conduits in alternate directions; and means inside of the casing to maintain the walls of said conduits at the required temperature.

2. In a device of the character described, a casing; a plurality of conduits extending from end to end in said casing, each conduit having a substantially spiral passage therethru; inlet and outlet chambers formed at the opposite sides of the casing in communication with respective open ends of the said conduits; adjustable means in said chambers for directing an air flow thru the successive conduits in alternate directions; and means inside of the casing to maintain the walls of said conduits at the required temperature.

3. In a device of the character described, a casing, having double end walls thereon forming a chamber in each double wall; a plurality of conduits extending from the inner wall of one double wall to the inner wall of the other; one of the said chambers being connected to a source of air flow and the other to a compartment to be ventilated; means in said chambers to direct the air flow from one chamber to the other thru the successive conduits in alternate directions, thereby causing the air flow to travel thru a tortuous path; and dampers in the chambers.

4. In a device of the character described, a casing; chambers formed at the opposite ends of the casing, one of said chambers being connected to an air inlet and the other to an air outlet conduit; a plurality of conduits connecting said chambers with each other; a spiral baffle having sharp angles therein in each conduit for forming a substantially baffled spiral passage therethru; and means in said casing for maintaining the walls of said conduits at a required temperature.

5. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising deflector plates between the adjacent conduits, said plates having apertures therein in alignment with the second conduits so as to allow the passing of fluid from one of the latter conduits to the next and to cause a whirl of air or vapor around the said second conduits; and means in the said casing for conveying a heating or cooling substance into the chamber for maintaining the walls of said second conduits at a required temperature.

6. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; and means for forcing a current of air thru said inner chamber around the said second conduits, thereby causing evaporation of the fluid from said coverings, and cooling the walls of said second conduits, thus effecting the cooling of the air passing thru the passages of said second conduits.

7. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said covering, said casing having an inlet and outlet opening on the inner chamber in which the second conduits are disposed; dehumidifying means for forcing a current of dehumidified air thru said inner chamber around the said second conduits, thereby causing evaporation of the fluid from said coverings, and cooling the walls of said second conduits, thus effecting the cooling of the air passing thru the passages of said second conduits.

8. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; means for forcing a current of air thru said inner chamber around the said second conduits, thereby causing evaporation of the fluid from said coverings, and cooling the walls of said second conduit, thus effecting the cooling of the air passing thru the passages of said second conduits; and deflector plates between the adjacent second conduits, said plates being adapted to cause the impingement of the air current in the casing upon the whole circumference of each covering.

9. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; dehumidifying means for forcing a current of dehumidified air thru said inner chamber around the said second conduits, thereby causing evaporation of the fluid from said coverings, and cooling the walls of said second conduits, thus effecting the cooling of the air passing thru the passages of said second conduits; and deflector plates between the adjacent second conduits, said plates being adapted to cause the impingement of the dehumidified air current in the casing upon the whole circumference of each covering.

10. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; means for forcing a current of air thru said inner chamber around the said second conduits, thereby causing evaporation of the fluid from said coverings, and cooling the walls of said second conduits, thus effecting the cooling of the air passing thru the passages of said second conduits; and adjustable means in the inlet and outlet chambers for directing the flow of ventilating air thru a certain number of said second conduits, successively in alternate directions from inlet chamber to outlet chamber and vice versa.

11. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; means for forcing a current of air thru said inner chamber around the said second conduits, thereby causing evaporation of the fluid from said coverings, and cooling the walls of said second conduits, thus effecting the cooling of the air passing thru the passages of said second conduits; adjustable means in the inlet and outlet chambers for directing the flow of ventilating air thru a certain number of said second conduits, successively in alternate directions from inlet chamber to outlet chamber and vice versa; and means for creating a forced air current thru said second conduits.

12. In a device of the character described, a casing; chambers formed at the opposite ends of the casing, one of said chambers being connected to an air inlet and the other to an air outlet conduit; a plurality of conduits connecting said chambers with each other; a spiral baffle in each conduit for forming a substantially spiral passage therethru; means in said casing for maintaining the walls of said conduits at a required temperature; said last means comprising a spray conduit above the uppermost of said second conduits; a moisture-absorbing covering surrounding each of the second conduits; the fluid from said spray conduit saturating the said coverings, said casing having an inlet and outlet opening on the inner chamber in which the second conduits are disposed; means for forcing a current of air thru said inner chamber around the said second conduits, thereby causing evaporation of the fluid from said coverings, and cooling the walls of said second conduits, thus effecting the cooling of the air passing thru the passages of said second conduits; and means to selectively connect said spray conduit to a water main or to a steam line; said inlet and outlet openings of the inner chamber being adapted to be closed so as to allow the creation of a steam filled chamber when the device is used for heating.

13. In a device of the character described, a casing; chambers formed at the opposite ends of the casing, one of said chambers being connected to an air inlet and the other to an air outlet duct; a plurality of conduits connecting said chambers with each other; a spiral baffle in each conduit for forming a substantially spiral passage therethru; means in said casing for maintaining the walls of said conduits at a required temperature; said last means comprising a sprayer above the uppermost of the conduits; a moisture-absorbing covering surrounding each of the conduits; the fluid from said sprayer saturating the said coverings, said casing having an inlet and outlet opening in the inner chamber in which the conduits are disposed; dehumidifying means for forcing a current of dehumidified air thru said inner chamber around the conduits, thereby causing evaporation of the fluid from said coverings, and cooling the walls of the conduits, thus effecting the cooling of the air passing thru the passages of said conduits; said dehumidifying means comprising a dehumidifying casing having an inlet and an outlet opening therein; means to force an air flow thru said last inlet opening and thru the dehumidifying casing out thru said outlet opening, said last outlet opening being connected to the said inner chamber of said first casing; and a screen covered with a dehumidifying substance, covering the outlet opening in such a manner as to cause the air discharged from the dehumidifying casing to pass thru said substance.

In testimony whereof I affix my signature.

FRANK E. DONALDSON.